(12) United States Patent
Bloom et al.

(10) Patent No.: US 10,175,653 B1
(45) Date of Patent: Jan. 8, 2019

(54) WATCH GLOW LIGHT BAND

(71) Applicant: Apple Inc., Cupertino, CA (US)

(72) Inventors: David H. Bloom, San Francisco, CA (US); Miao He, Sunnyvale, CA (US); Megan A. McClain, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 18 days.

(21) Appl. No.: 15/357,469

(22) Filed: Nov. 21, 2016

Related U.S. Application Data

(60) Provisional application No. 62/397,679, filed on Sep. 21, 2016.

(51) Int. Cl.

| | |
|---|---|
| *G04B 45/00* | (2006.01) |
| *A44C 5/00* | (2006.01) |
| *A44C 5/24* | (2006.01) |
| *A44C 15/00* | (2006.01) |
| *F21V 8/00* | (2006.01) |
| *H05B 33/08* | (2006.01) |
| *H05B 37/02* | (2006.01) |

(52) U.S. Cl.
CPC ........ *G04B 45/0015* (2013.01); *A44C 5/0053* (2013.01); *A44C 5/24* (2013.01); *A44C 15/0015* (2013.01); *G02B 6/001* (2013.01); *G02B 6/0006* (2013.01); *G04B 45/00* (2013.01); *H05B 33/0863* (2013.01); *H05B 33/0872* (2013.01); *H05B 37/0245* (2013.01)

(58) Field of Classification Search
CPC .................................................... G04B 45/00
See application file for complete search history.

(56) References Cited

U.S. PATENT DOCUMENTS

| | | | | |
|---|---|---|---|---|
| 3,817,595 A | * | 6/1974 | Edelman | G02B 6/04 156/173 |
| 5,701,370 A | * | 12/1997 | Muhs | G01B 11/18 385/12 |
| 8,787,006 B2 | * | 7/2014 | Golko | G06F 1/163 361/679.03 |
| 2003/0103414 A1 | * | 6/2003 | Lyon | G04G 17/083 368/10 |
| 2004/0066659 A1 | * | 4/2004 | Mezei | G02B 6/001 362/555 |
| 2008/0004510 A1 | * | 1/2008 | Tanzawa | A44C 5/0015 600/301 |
| 2016/0356957 A1 | * | 12/2016 | Sawada | G02B 6/1221 |

* cited by examiner

*Primary Examiner* — Douglas W Owens
*Assistant Examiner* — Pedro C Fernandez
(74) *Attorney, Agent, or Firm* — Morgan, Lewis & Bockius LLP

(57) ABSTRACT

Watch bands with multiple light tubes, each light having a light fiber and at least one light-emitting diode for providing light to each light tube. The light-emitting diode may produce a wide color gamut for the light fiber to produce light in each light tube. Each light-emitting diode may produce a different color and light intensity different from the other light tubes in the watch band. The light tubes doubles as the structure for attaching a watch body to a user's wrist and as a carrier of light to add variety and style to the watch band. The watch band may have a variety of different attachment mechanisms for attaching and securing the watch body to the user's wrist.

22 Claims, 9 Drawing Sheets

WATCH GLOW LIGHT BAND

CROSS-REFERENCE TO RELATED APPLICATION

This application claims priority to U.S. Provisional Application No. 62/397,679, filed on Sep. 21, 2016, which is incorporated herein in its entirety by reference thereto.

FIELD

The described embodiments relate generally to a wearable device. More particularly, the present embodiments relate to a watch band for a wristwatch or other wrist-mounted device (e.g., a smartwatch).

BACKGROUND

Recent advances in smartwatches have led to improvements in watch bands for smartwatches. Users may desire the ability to customize their watch bands to express variety and style.

SUMMARY

The present disclosure describes watch bands with multiple light-tube assemblies. The light-tube assemblies may include a light tube, a light fiber within each light tube that extends the length of the light tube, and at least one light-emitting diode (LED) for providing light in each light tube. The LED may produce a wide color gamut for the light fiber to produce light. Each LED may produce light characteristics different from the other LEDs in the watch band. Alternatively, all LEDs may produce the same light characteristics. The light tubes may double as both the structure for attaching a watch body to a user's wrist and a carrier of light to add variety and style to the watch band. Watch bands as described may have a variety of different attachment mechanisms for attaching and securing the watch body to the user's wrist.

Each light tube may have characteristics that may affect how the light from the LED and light fiber pass through the light tube. Examples of light tube characteristics may be light tube shape, light tube thicknesses, light tube translucency, or light tube material. The material of the light tube may provide different refractive indexes for bending or refracting light. The light tubes for the watch band may be uniform or each light tube may have characteristics different from the other light tubes in the watch band.

Some embodiments of the watch band may include a processor that controls the light characteristics produced by each LED in the watch band. Light characteristics may include color, intensity, or duration of light produced by each LED in the watch band. These lighting characteristics may be generated by a predetermined color generator, a user-controlled application, or by signals received by the processor from an external data source. Thus, the light produced by the light-tube assemblies may be customizable by a user.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
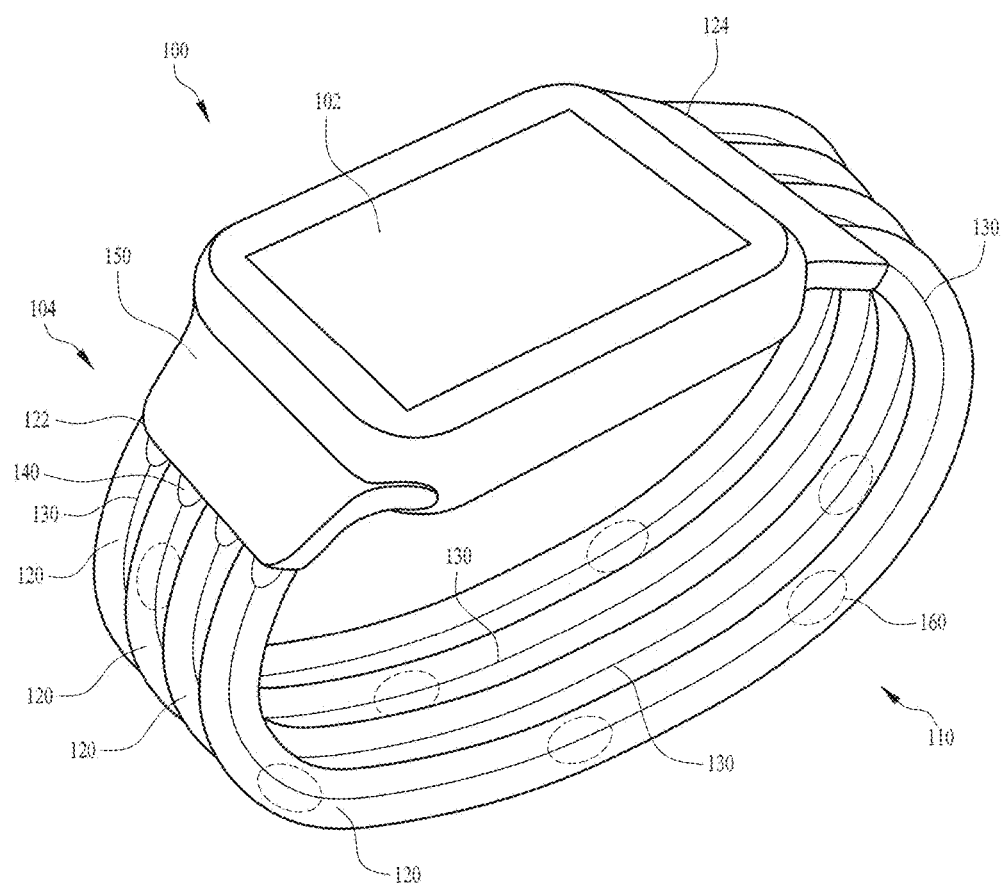
FIG. 1 shows a perspective view of a wearable device including a watch band.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to watch bands with multiple light-tube assemblies to provide light to a watch band. The light-tube assemblies may give a glowing ambience to the watch band. The light-tube assemblies may be both (1) the structure for attaching a watch body of a watch to a user's wrist and (2) an emitter of colored light for the watch band to add variety and style to the watch band. Each light-tube assembly may include a light tube, a light fiber within the light tube that extends the entire length of the light tube, and at least one light-emitting diode (LED) that provides light for the light fiber. The light produced in each light-tube assembly may be independent of the light produced in any of the other light-tube assemblies of the watch band. Watch bands as described may be secured to a user's wrist in a variety of different manners and by a variety of different attaching mechanisms.

The light produced by the light-tube assemblies are impacted by the light characteristics of the LEDs (e.g., color, light intensity, duration, etc.), the type of light fiber used in the light-tube assemblies, and the physical characteristics of the light tube (e.g., light tube shape, light tube thicknesses, light tube transparency, or light tube material) in the light-tube assemblies. The light characteristics of the LEDs may be customizable by the user during use; however, the characteristics of the light fiber and light tube are dependent on the light fiber and light tube for each light-tube assembly.

In some embodiments, the wearable device may have a processor that controls the colors in each light-tube assembly. The processor may assign the colors for each light-tube assembly based on a user-controlled application or on data received from another data source. For instance, the user may use a separate device with image-capturing capabilities to capture an image of a desired color and send a signal to the processor to change the color of the light-tube assemblies based on the color in the captured image. Alternatively, the color of the light-tube assemblies may be based on data from an external data source (e.g., data based on the user's heart rate, current weather, or stock prices). For example, the processor may change light characteristics of the light-tube assemblies to preset colors based on the data.

These and other embodiments are discussed below with reference to the figures. However, those skilled in the art will readily appreciate that the detailed description given herein with respect to these figures is for explanatory purposes only and should not be construed as limiting. Also, any feature described with respect to an individual embodiment may be applied to the other described embodiments to the extent it is not inconsistent or otherwise conflicting with the features of the other embodiments.

FIG. 1 illustrates a wearable device 100 with a watch band 110 having multiple light-tube assemblies 104. Each light-tube assembly 104 may have a light tube 120, a light fiber 130 and at least one light-emitting diode (LED) 140. Each light tube 120 may extend from a first end 122 to a second end 124. Light fiber 130 (e.g., fiber-optic filament) may extend within light tube 120 from first end 122 to second end 124. Alternatively, each light tube 120 may have multiple light fibers 130 that extend from first end 122 to second end 124. Light fiber 130 may be a solid-core side-glow light fiber, solid-core end-glow light fiber, or any other suitable optical fiber. Light fiber 130 may be etched or have other surface treatment that affects the passage of light through its sides. For example, light fiber 130 may have a greater degree of surface treatment as a distance from LED 140 increases, to promote even light transmission along light fiber 130. Further, LEDs 140 may be positioned within each light tube 120 (e.g., at first end 122 or second end 124). LEDs 140 may be located within watch body connectors 150 or may be located outside of watch body connectors 150, as illustrated in FIG. 1. Alternatively, LEDs 140 may be located within watch body 102. LEDs may be powered by a battery of wearable device 100. LEDs 140 may be a RGB LEDs to produce a wide color gamut.

Light tubes 120 may extend into watch body connectors 150. Watch body connectors 150 may be components of watch band 110 that attach watch band 110 to watch body 102 of wearable device 100. Each watch body connector 150 may also enable an electrical connection to be established between watch body 102 and watch band 110 to allow data and/or power transfer between watch band 110 and watch body 102. Alternatively, light tubes 120 may be connected directly to watch body 102 rather than to watch body connectors 150. FIG. 1 illustrates two watch body connectors 150, with a watch band connector 150 on opposing ends of watch body 102 to attach watch band 110 to watch body 102.

Each LED 140 of watch band 110 may produce the same color so that watch band 110 has a uniform look. Alternatively, each LED 140 for each light tube 120 may produce colors independent of the light produced in the other light tubes 120 in watch band 110. This may enable watch band 110 to have multiple light tubes 120 each with a different color to add variety to watch band 110's appearance.

Light tubes 120 may be translucent to allow the passage of light from light fiber 130 to outside light tubes 120. FIG. 1 illustrates light tubes 120 as translucent merely to illustrate light fibers 130 and LEDs 140 within light tubes 120. For clarity, light tubes 120 are described as translucent in the specification but are otherwise not illustrated as translucent in the figures.

Alternatively, light tubes 120 may be opaque and light tubes 120 may define several openings 160 in opaque light tubes 120 to allow passage of light from light fiber 130 to outside opaque light tube 120. Openings 160 are shown in broken lines in FIG. 1. Openings 160 may be positioned in an arrangement that produces certain shapes or patterns. Alternatively, openings 160 may be positioned in an arrangement that optimizes light passage through opaque light tube 120 or otherwise allows consistent light passage through the opaque light tube 120. In some embodiments, instead of being physical openings, the openings are translucent areas of otherwise-opaque light tubes 120. Openings 160 may take any shape, for example ovals (as shown), lines, letters, glyphs, other symbols, etc.

FIG. 1 illustrates watch band 110 with four light tubes 120. However, the present disclosure is not so limited, and the number of light tubes 120 may be more or fewer than four light tubes 120. FIG. 1 also illustrates light tubes 120 with a circular cross section, however, the cross section of light tubes 120 may alternatively be oval, triangular, trapezoidal, etc. The size of each light tube 120 may also be different than shown. For example, each light tube 120 may be the same size, or alternatively, each light tube 120 may have a different size from other light tubes 120. Light tubes 120 may also have different thicknesses. Light tubes 120 may be fabricated from a variety of different materials, such as, for example, elastomers (e.g., thermoplastic elastomers (TPE)), plastics, rubber, or any other suitable material. The materials may have different refractive indexes which may bend the light from light fibers 130 at different angles. Light tubes 120 of watch band 110 may all be the same, thus giving watch band 110 a uniform look. Alternatively, each light tube 120 of watch band 110 may be different based on the above-described characteristics of light tubes 120.

In another embodiment, light tubes 120 may be encompassed within an outer covering of watch band 110. For example, light tubes 120 may be molded within a material, such as, for example, elastomers, thermoplastic elastomers (TPE), plastics, rubber, or any other suitable material. By encompassing light tubes 120 within the material, watch band 110 may have a more traditional appearance. The material of watch band 110 may be translucent or opaque, thus the passage of light through the material may vary. If the material is opaque, the material may define openings (e.g., similar to openings 160) to allow the passage of light from LEDs 140 and light fibers 130 to outside of the opaque material of watch band 110. The openings may be positioned in a way that allows consistent light passage through the opaque material or otherwise optimizes light passage through the opaque material. The openings may also be arranged to produce certain shapes or patterns, and may take any shape, as described above.

Figure 2:
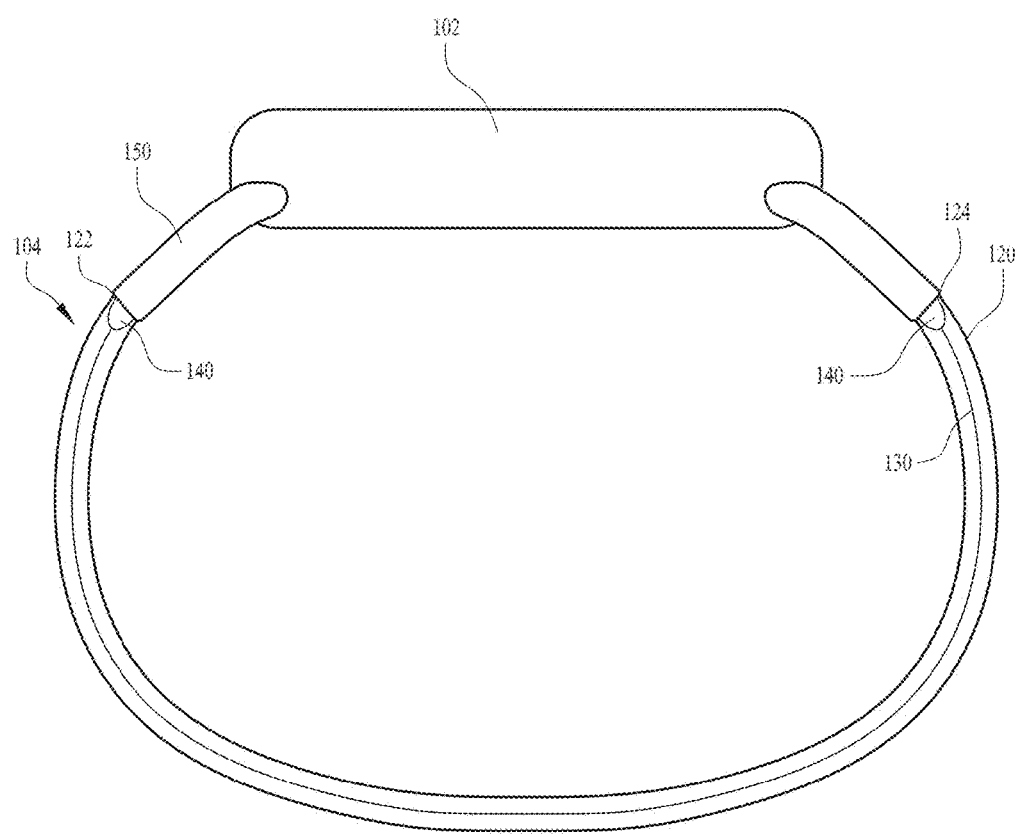
FIG. 2 shows a side view of a wearable device with light-emitting diodes located at each end of a watch band.
Figure 3:
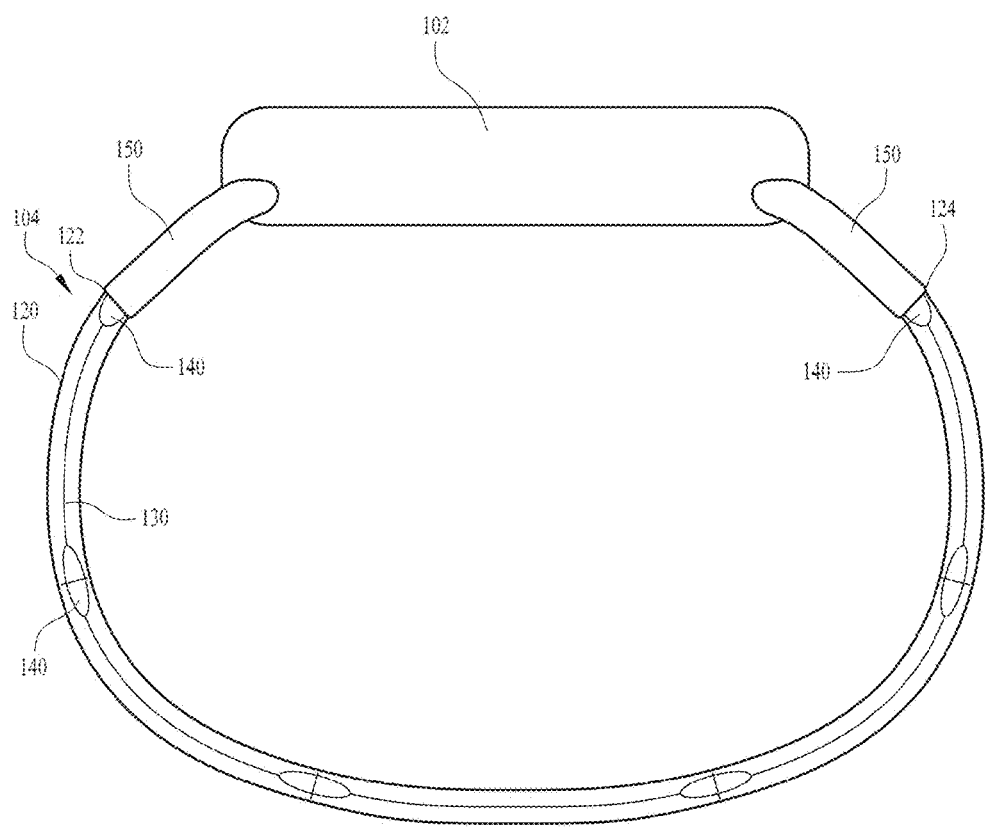
FIG. 3 shows a side view of a wearable device with multiple light-emitting diodes located through a watch band.

FIGS. 2 and 3 illustrate side views of exemplary embodiments of wearable device 100 and watch band 110 with multiple LEDs 140 within each light tube 120. In FIG. 2 LEDs 140 are located at opposing ends 122 and 124 of each light band 120. In FIG. 3 LEDs 140 are spaced throughout light tube 120. In both FIGS. 2 and 3, pairs of opposing LEDs are connected by and provide light to light fibers 130. LEDs spaced apart from watch body 102 or watch body connector 150 may be powered by wire traces within light tubes 120 that are connected to a battery of wearable device 100 (e.g., within watch body 102 or watch body connector 150).

Opposing LEDs 140 within each light tube 120 may increase the amount of light that travels through light fiber 130 and may provide a more even and consistent light output along light fiber 130. This can increase the amount and evenness of light that passes outside of light tube 120, presenting a brighter, more consistent color for watch band 110.

Watch band 110 may attach to opposing sides of watch body 102 and watch band 110 may wrap around a user's wrist to secure wearable device 100 to the user's wrist. According to an embodiment illustrated in FIGS. 4 and 5, light tubes 120 may be fabricated from a flexible material that allows the stretching of light tubes 120, and allows light tubes 120 to revert back to their original shape without permanent deformation. Accordingly, the user would be able to slip their wrist through stretched light tubes 120 of watch band 110 and then have light tubes 120 revert back to their original shape. The original shape of light tubes 120 may allow the circumference of wearable device 100 to be substantially the same as the circumference of the user's wrist, thus enabling wearable device 100 to be secured to the user's wrist without any permanent deformation of light tubes 120. Light tubes may be fabricated from a variety of materials, such as, for example, elastomers, thermoplastic elastomers (TPE), plastics, rubber, or any other suitable material.

Figure 4:
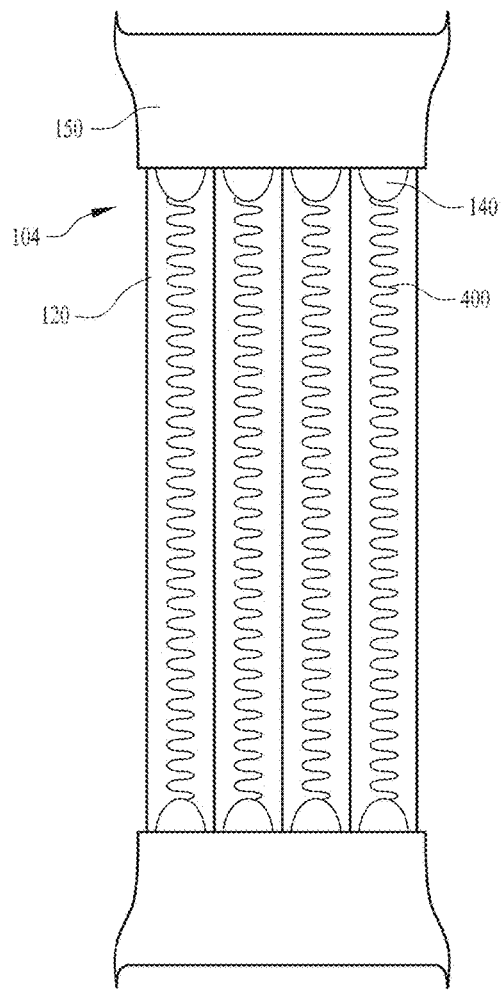
FIG. 4 shows a top view of a watch band of a wearable device with a helically coiled light fiber in an unextended state.
Figure 5:
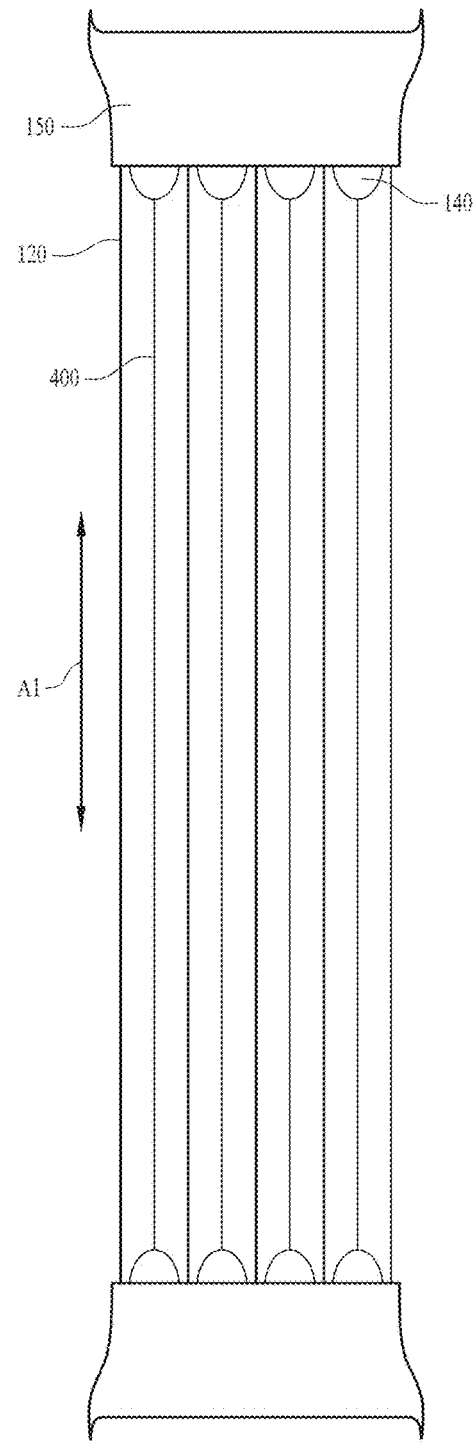
FIG. 5 shows a top view of a watch band of a wearable device with a helically coiled light fiber in a fully extended state.

As shown in FIG. 4, light fibers 400 may be helically coiled or otherwise non-straight when light tubes 120 are not stretched. The user may apply a force along a first direction A1, as illustrated by the arrow, to an extended position in FIG. 5, stretching watch band 110 to extend their hand through it. When the force is no longer applied, flexible light tubes 120 revert back to their original unextended shape as illustrated in FIG. 4 (or to an intermediate position between FIGS. 4 and 5 depending on the size of the user's wrist). The helical coil of light fiber 400 enables light fiber 400 to extend and retract based on the stretching of light tube 120. FIG. 5 illustrates flexible light tube 120 and helically coiled light fibers 400 in an extended or stretch position. The use of helically coiled light fiber 400 helps maintain the integrity of light fiber 400 while the user stretches light tubes 120 to don and doff wearable device 100.

Figure 6:
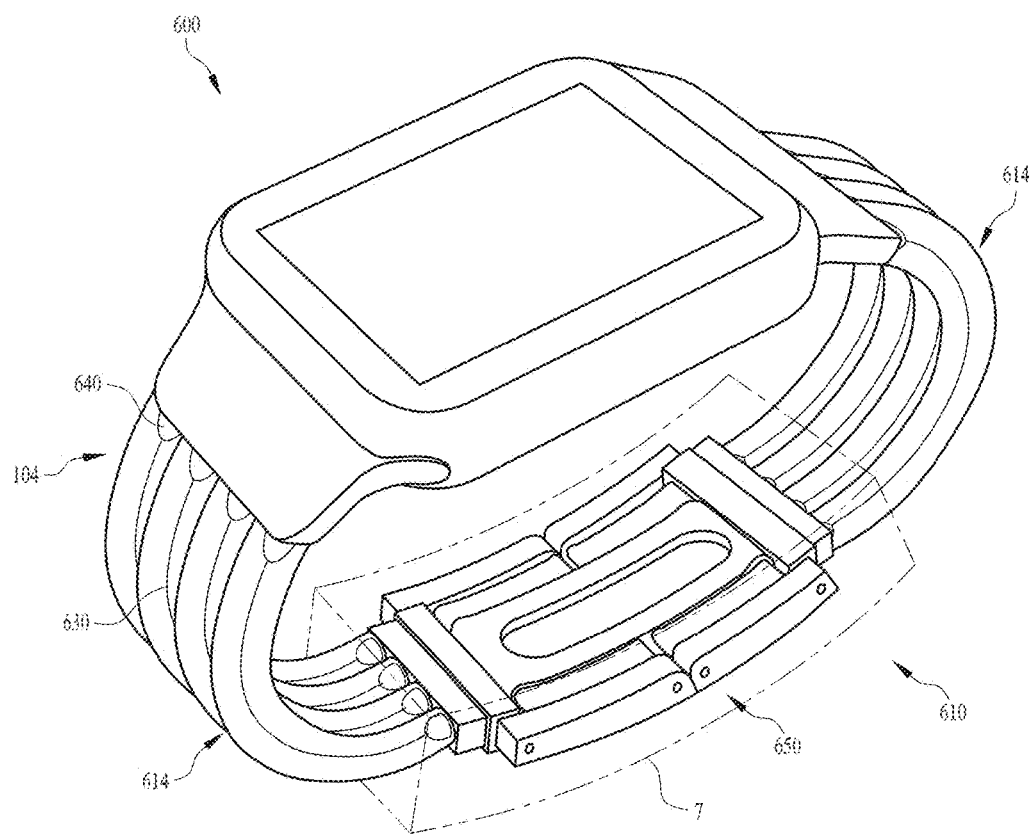
FIG. 6 shows a perspective view of a wearable device including with a watch band and clasp.

FIG. 6 illustrates an exemplary embodiment for attaching a wearable device 600 to a user's wrist using a watch band 610. Watch band 610 may have a first band portion 612 and a second band portion 614. Watch band 610 may be similar to watch band 110, and may include multiple light tubes 620 with a light fiber 630 within each light tube 620. At least one LED 640 may be located within each light tube 620. FIG. 6 illustrates LEDs 640 located at opposing ends within each light tube 620 of first band portion 612 and second band portion 614. Watch band 610 may include a hidden deployment clasp 650 that is out of view when watch band 610 is attached to the user's wrist. Hidden deployment clasp 650 may enable light tubes 620 of first band portion 612 and second band portion 614 to be aligned to each other when clasp 650 is secured.

Figure 7:
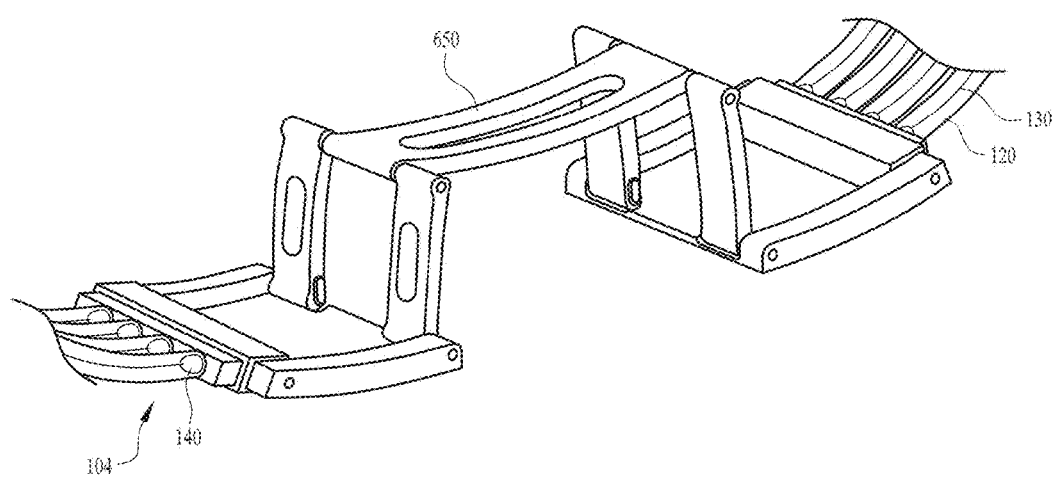
FIG. 7 shows a detail view of watch band of FIG. 6 in an opened position.

FIG. 7 illustrates a detailed view of hidden deployment clasp 650 when clasp 650 is opened. When clasp 650 is opened, the user may insert their wrist into watch band 610, and then close clasp 650 to secure wearable device 600 to the user's wrist and align light tubes 620 of first band portion 612 with corresponding light tubes 620 of second band portion 614 located across clasp 650.

Figure 8:
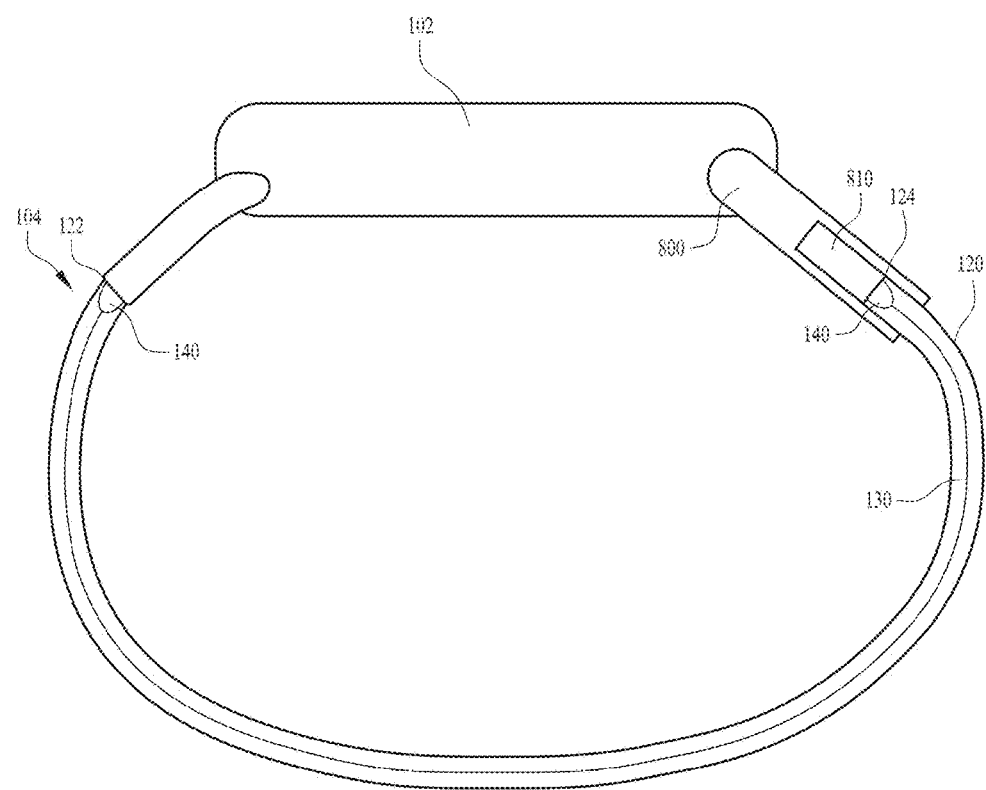
FIG. 8 shows a side view of wearable device with a watch band fastener.

FIG. 8 illustrates another exemplary embodiment for attaching watch band 110 to the user's wrist. Watch band 110 may include a fastener 800 located near either first end 122 or second end 124 of watch band 110. Fastener 800 may include a slot 810 for receiving one end of light tubes 120. The user may be able to adjust the fit of watch band 110 by sliding light tubes 120 to an appropriate spot in slot 810. Light tubes 120 may be secured within slot 810 in a variety of manners, for example, friction-fit, a buckle, a latch, a snap, a hook-and-loop fastener, magnetic attraction, or other mechanical interlock or attachment mechanism. The user may also be able to completely remove light tubes 120 from slot 810 of fastener 800, thus making it easier for the user to don and doff wearable device 100.

Watch band 110 may have a variety of other different attachment mechanisms for securing wearable device to the user's wrist without departing from the spirit and scope of the invention. Accordingly, as described above, light-tube assemblies 104 may act as the structure for attaching wearable device 100 to the user's wrist as well as act as a carrier of light.

Figure 9:
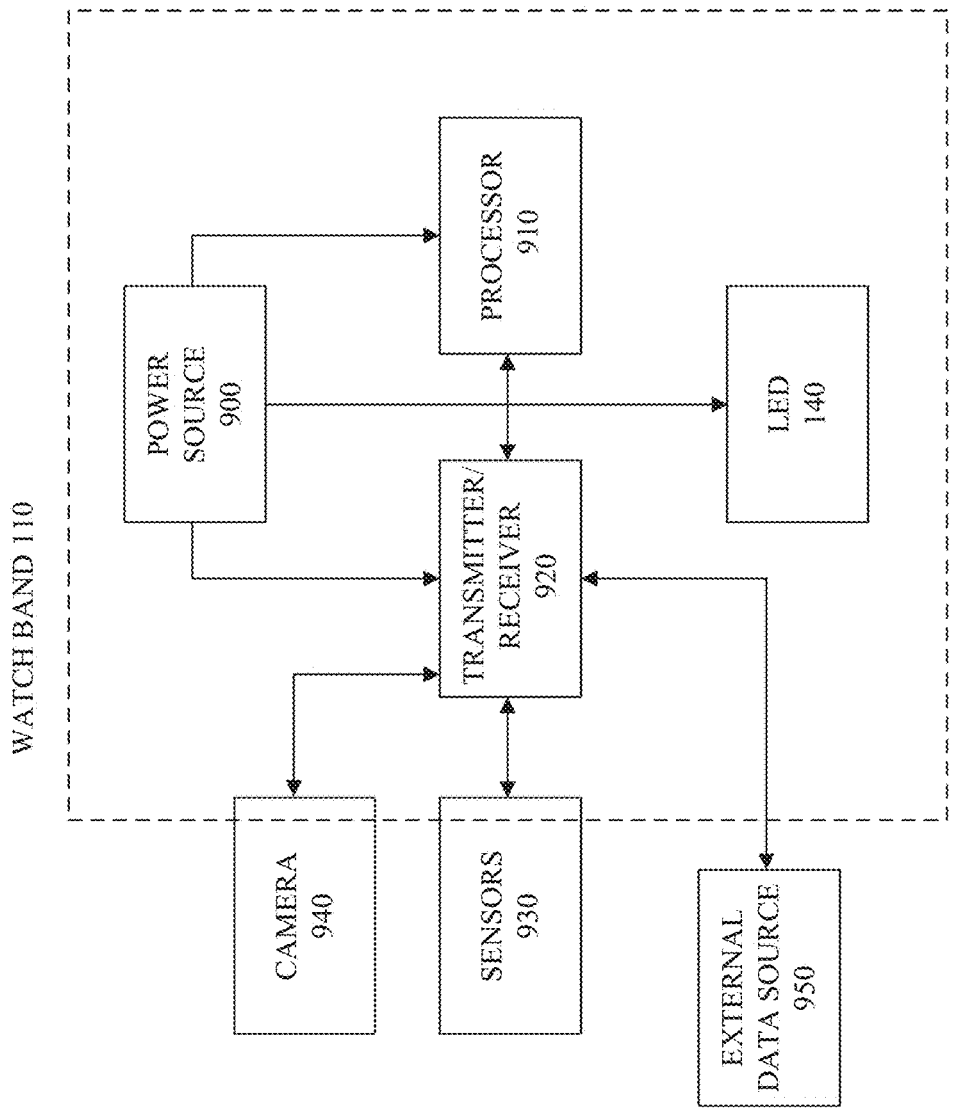
FIG. 9 shows a diagram of electrical components of a watch band.

FIG. 9 illustrates a flowchart of the electronic components of watch band 110. Watch band 110 may include a power source 900, a processor 910, and a transmitter/receiver 920. Watch band 110 may further include a variety of different sensors 930, such as, for example, light sensors, sound sensors, motion sensors (e.g., accelerometers, gyroscopes, etc.), heath sensors, biometric sensors and the like. Sensors 930 may be located on watch band 110 itself or sensors 930 may be located on a separate device that is in communication with transmitter/receiver 920 and processor 910. Watch band 110 may further include a camera 940 that may be located on watch band 110 itself or may be located on a separate device that is in communication with transmitter/receiver 920 and processor 910. Processor 910 may also be in communication with an external data source 950 that may transmit data to processor 910 by way of transmitter/receiver 920. These electronic components may be housed within watch body connector 150 of watch band 110. Alternatively, watch band 110 may be electrically connected to watch body 102 of wearable device 100 to enable data and/or power transfer between watch body 102 and watch band 110. If watch body 102 and watch band 110 are electrically connected, power source 900, processor 910, transmitter/receiver 920, sensors 930 and camera 940 may be housed in watch body 102.

Processor 910 is configured to change the light characteristics of each LED 140 in watch band 110, 610. Light characteristics include light color, light intensity, light state (on or off), and light duration. Light characteristics also include light pattern, which can be changes over time of any of light color, light intensity, light state, and light duration. Each LED 140, 640 may produce light characteristics independent of the other LEDs 140, 640. In other words, watch band 110, 610 may produce a common light characteristics for all of its LEDs 140, 640 or watch band 110, 610 may produce different light characteristics for each LED 140, 640 at the same time. Further, the light produced by watch band 110 may be dynamic. In other words, the light characteristics of watch band 110, 610 may constantly be changing. Processor 910 may receive signals from a variety of different sources to change the light characteristics produced by each LED 140, 640.

For example, processor 910 may control LEDs 140 so that watch band 110 may be used like a flashlight, which may be beneficial at night. The user may be able to activate light-tube assemblies 104 to provide light at night so that the user may move around in the dark by the light of watch band 110 without having to turn on lights in the house or turn on a flashlight. The light output in this case may be a white or blue-tinted light, and may be dimmable so that the user can set an appropriate intensity (i.e., brightness) for their circumstance. Light-tube assemblies 104 may be activated by, for example, giving a verbal command, pressing a button on watch body 102 (e.g., on a display of watch body, which may include a graphical user input on a touchscreen of the display), or by receiving a signal based on sensed motion of the wearer (e.g., by a sensor such as an accelerometer or gyroscope). For example, light-tube assemblies 104 may be activated upon wearable device 100 sensing motion (or a magnitude of change in motion) above a threshold level, which may be used to determine that the user has woken up or gotten out of bed.

Figure 10:
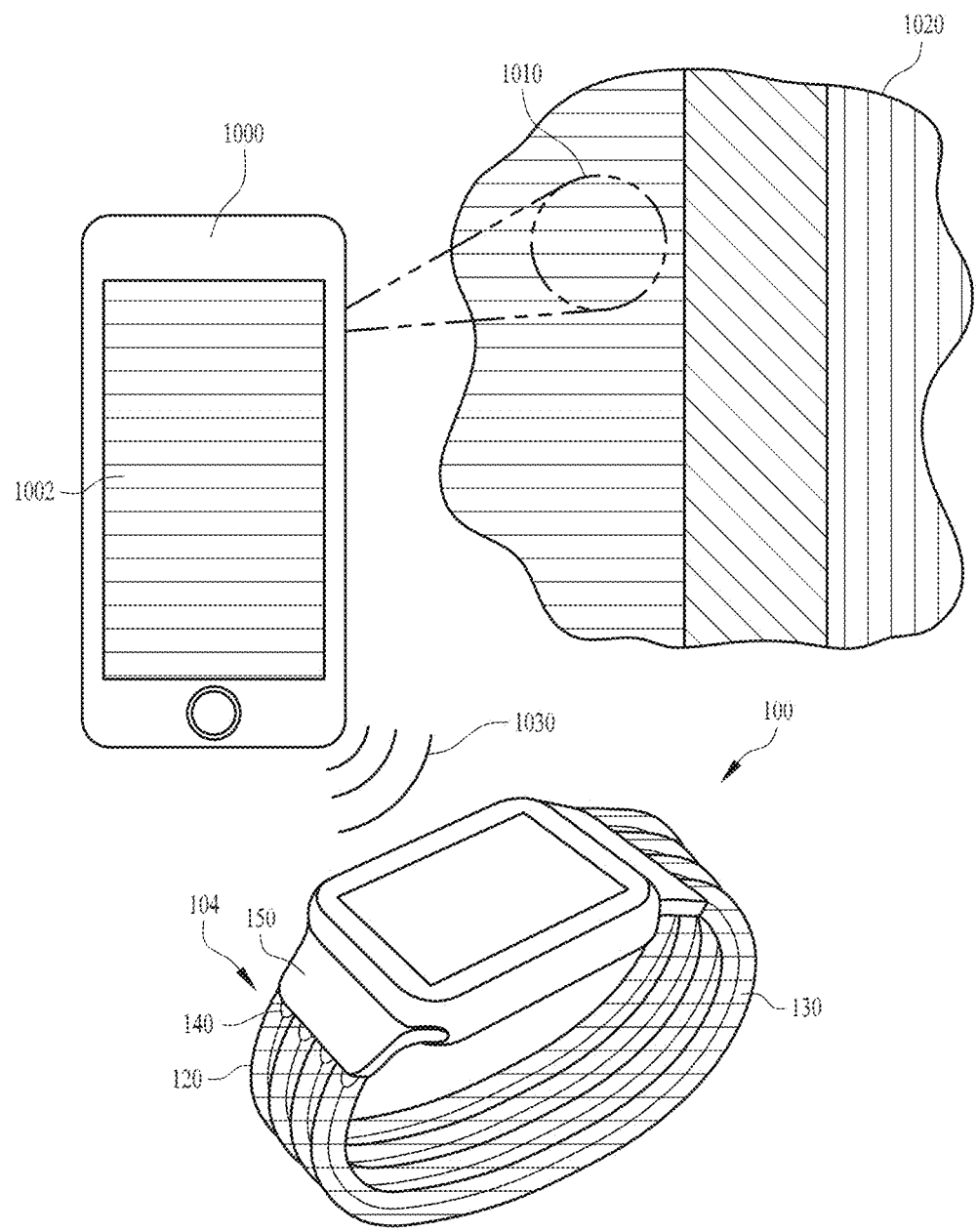
FIG. 10 shows a separate device capturing an image to select a color of the watch band.

FIG. 10 illustrates a separate device 1000 that sends a signal to processor 910 to change the light produced by LEDs 140. Separate device 1000 may be an image-capturing device that has a camera 940 and a camera lens, for example, a smartphone, tablet, laptop, personal computer, digital camera, and the like. The user may use separate device 1000 to capture an image 1010 of any nearby color 1020 using camera 940. Image 1010 captured by camera 940 may be displayed on a display 1002 of separate device 1000. Display 1002 may display the field of view of camera 940 and enable the user to adjust the field of view of camera 940 to capture or otherwise select the desired color. Once image 1010 is captured by camera 940 of separate device 1000, the user may transmit a signal 1030 indicating a color in the captured image 1010 (e.g., an average color in the image) to processor 910 in watch band 110. For example, the user may select a desired color by tapping on the desired color within the captured image 1010 on display 1002. Separate device 1000 may then transmit signal 1030 to processor 910 indicating the selected color within image 1010. Further, the user may select multiple colors from the captured image 1010 and each selected color may be used for different light tubes 120 in the watch band 110. When processor 910 receives signal 1030 from separate device 1000, processor 910 may change the color of LEDs 140, 640 based on the signal received by processor 910. Processor 910 may also rotate through multiple colors and sequentially change the color of LEDs 140, 640 based on the selection sequence of multiple colors.

Separate device 1000 may also be a watch body (e.g., watch body 102) that is attached to watch band 110, 610, together forming a smartwatch. The smartwatch may have a camera 940 (e.g., in watch body 102 or in watch band 110 itself). The user may use camera 940 to capture image 1010 to select a color for LEDs 140 of watch band 110. Alternatively, camera 940 may be used to constantly capture the average color in the surrounding area and at the same time be constantly changing the overall color of watch band 110 based on the average color constantly captured by camera 940 on either watch body 102 or watch band 110.

Separate device 1000 may have an application that may enable the user to capture color images with camera 940 of separate device 1000 to set the light characteristics of each LED 140 in watch band 110. The user may use the same color for each LED 140, 640, or the user may select different colors for each LED 140, 640 to customize watch band 110, 610. Accordingly, the user may customize the color of watch band 110, 610 based on the color that is captured by camera 940 on separate device 1000. For example, the user may use separate device 1000 to capture image 1010 of a user's outfit (e.g., shirt, skirt, pants, etc.) to coordinate the color of watch band 110 with the user's outfit.

Separate device 1000 may communicate with processor 910 of watch band 110, 610 by a number of different ways. For example, separate device 1000 may communicate with processor 910 by wireless network, Bluetooth®, Zigbee®, cellular network, LAN, WAN, or any other suitable transmission communication.

The colors of LEDs 140 of watch band 110, 610 may also be selected and changed in a variety of other manners as well. The user may manually select the colors for each LED 140, 640 using a color wheel or other interface displayed on separate device 1000, which may then send a signal to processor 910 to change the light characteristics of each LED 140, 640 based on the selected color(s). Alternatively, processor 910 may select the light characteristics of each LED 140, 640 randomly (e.g., based on output of a random color generator of separate device 1000).

In some embodiments, the light characteristics of LEDs 140, 640 may be a function of external data source 950. For example, processor 910 may receive a signal based on the current weather conditions that are either collected via sensor 930 located on watch band 110 or separate device 1000 or received using a weather application (e.g., via separate device 1000). Sensors 930 or the weather application may send a signal to processor 910 indicating colors based on the weather, for example, yellow for sunny, blue for rainy, white for cloudy, etc.

In another example, external data source 950 may include time data that provides the time of day to processor 910 so that processor 910 may change light characteristics of LEDs 140, 640 based on the time. For example, the user may select certain colors for different times of the day and LED 140, 640 may automatically adjust the color of LEDs 140, 640 based on the current time.

In another example, external data source 950 may include data about the user recorded by sensors 930 on watch band 110 or separate device 1000. For example, watch band 110, 610 or separate device 1000 may include physical sensors that track a user's physical characteristics throughout the day (e.g., heart rate, blood pressure, blood-glucose, steps taken, etc.). The light characteristics of each LED 140, 640 may vary depending on the data sensed by sensors 930. For example, the user may set certain colors to be displayed depending on whether the user's heart rate is within a certain range. Or the colors and intensities of each LED 140, 640 may change as the user progresses toward a goal (e.g., progressing from red to yellow to green as the user walks 0; 5,000; and 10,000 steps for the day.) Or the colors may represent current physical characteristics of the user so that their condition can be easily visually assessed by looking at the color of their watch band. For example, if any of a user's physical characteristics passes a threshold, the color of their watch band may change. Green may mean all physical characteristics are within normal ranges, yellow might mean that one or more physical characteristics have deviated from normal by a non-critical amount, and red might mean that one or more physical characteristics have deviated from normal by a critical amount.

In another example, external data source 950 may be current stock prices. A signal may be sent to processor 910 based on stock price information obtained from external data source 950. For example, separate device 1000 may be connected to a stock price application or separate device 1000 may gather stock information from a network for stock prices for specific stocks, specific stock indexes, or even the user's own investments. A signal may be sent to processor 910 to change the color of LEDs 140 to a predetermined color selected by the user based on stock performance or to default colors loaded on processor 910.

In another example, external data source 950 may be based on notifications received by separate device 1000. For example, when a text message is received on separate device 1000, a phone call is received or missed on separate device 1000, a notification from an application on separate device 1000 is received, (e.g., news reports, sport scores, etc.), a signal may be sent to processor 910 to change the light characteristics of LEDs 140 to a color and/or pattern (e.g., blinking) previously selected by the user or default color that is preset in processor 910.

The foregoing descriptions of the specific embodiments described herein are presented for purposes of illustration and description. These exemplary embodiments are not intended to be exhaustive or to limit the embodiments to the precise forms disclosed. All specific details described are not required in order to practice the described embodiments.

It will be apparent to one of ordinary skill in the art that many modifications and variations are possible in view of the above teachings, and that by applying knowledge within the skill of the art, one may readily modify and/or adapt for various applications such specific embodiments, without undue experimentation, without departing from the general concept of the present invention. Such adaptations and modifications are intended to be within the meaning and range of equivalents of the disclosed embodiments, based on the teaching and guidance presented herein.

The Detailed Description section is intended to be used to interpret the claims. The Summary and Abstract sections may set forth one or more but not ally exemplary embodiments of the present invention as contemplated by the inventors, and thus, are not intended to limit the present invention and the claims.

The phraseology or terminology used herein is for the purpose of description and not limitation, such that the terminology or phraseology of the present specification is to be interpreted by the skilled artisan.

The breadth and scope of the present invention should not be limited by any of the above-described exemplary embodiments, but should be defined in accordance with the claims and their equivalents.

What is claimed is:

1. A watch band comprising:
   a watch body connector configured to attach the watch band to a watch body, the watch body having a display with a touchscreen;
   light tubes connected to the watch body connector;
   a light fiber within each light tube that extends through an entirety of the light tube; and
   a light-emitting diode within each light tube that is configured to emit light into an end of one of the light fibers.

2. The watch band of claim 1, further comprising a light-emitting diode disposed at each of the opposing ends of each light tube.

3. The watch band of claim 1, wherein each light tube contains multiple light-emitting diodes.

4. The watch band of claim 1, wherein each light tube is made of an extendable material, and wherein each light fiber is helically coiled within its light tube.

5. The watch band of claim 1, further comprising:
   a first watch band portion with multiple light tubes coupled to a first side of the watch body;
   a second watch band portion with an equal number of light tubes coupled to an opposing side of the watch body; and
   a watch band fastener configured to fasten first band portion to second band portion and to align the light tubes of the first band portion with the light tubes of the second band portion.

6. The watch band of claim 1, wherein each light tube is opaque with discrete areas that allow the passage of light from the light tube.

7. The watch band of claim 1, wherein each light tube has a different refractive index.

8. The watch band of claim 1, wherein each light tube is embedded within an outer covering, and wherein the outer covering defines openings that allow the passage of light from the light tubes to outside the outer covering.

9. The watch band of claim 1, wherein the watch band further comprises a processor, wherein the processor is configured to receive signals to turn on and turn off the light-emitting diodes and to change the colors and light intensity of the light-emitting diodes.

10. The watch band of claim 9, wherein the processor receives a signal to control the light-emitting diodes from a user-based application.

11. The watch band of claim 9, wherein the processor receives a signal from a camera to change the color of the light-emitting diodes based on a color of a captured image from the camera.

12. The watch band of claim 11, wherein the camera is included in the watch band.

13. The watch band of claim 11, wherein the camera is included in a separate device in communication with the processor.

14. The watch band of claim 9, wherein the processor receives a signal to change the color of each light-emitting diodes based on data from an external data source.

15. A watch, comprising:
    a watch body;
    a watch band that produces light;
    a processor; and
    an image-capturing device;
    wherein the processor controls a color of the light produced by the watch band based on a signal received from the image-capturing device, and wherein the signal is based on a color in an image captured by the image-capturing device.

16. The watch of claim 15, wherein the image-capturing device is separate from the watch body.

17. The watch of claim 15, wherein the image-capturing device transmits a signal to the processor to change the color of the light produced by the watch band based on an average color of a captured image.

18. The watch of claim 15, wherein the image-capturing device transmits a signal to the processor to change the color of the light produced by the watch band based on a color selected from a captured imaged.

19. The watch of claim 15, wherein the watch band comprises multiple light-tube assemblies, wherein each light-tube assembly comprises:
    multiple light tubes;
    a light fiber within each light tube that extends through an entirety of the light tube; and
    a light-emitting diode disposed at an end of each light tube, each light-emitting diode configured to emit light into the end of its light tube.

20. A watch band comprising:
    a watch body connector configured to attach the watch band to a watch body;
    a light tube connected to the watch body connector;
    within the light tube, multiple light-emitting elements; and
    within the light tube, multiple light fibers, wherein each of the light fibers is positioned between an opposing pair of the light-emitting elements.

21. The watch band of claim 20, wherein at least some of the light-emitting elements are positioned to emit light along the light tube and toward the watch body connector.

22. The watch band of claim 20, wherein the opposing pair of the light-emitting elements are positioned to emit light along the light tube and toward each other.

* * * * *